Dec. 15, 1970    H. FOKKER ET AL    3,546,876
HOT-GAS ENGINE
Filed Oct. 18, 1968
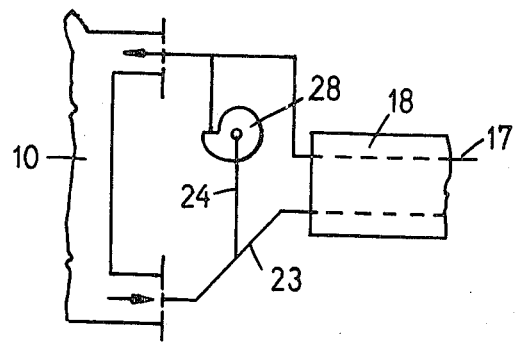
Fig. 3
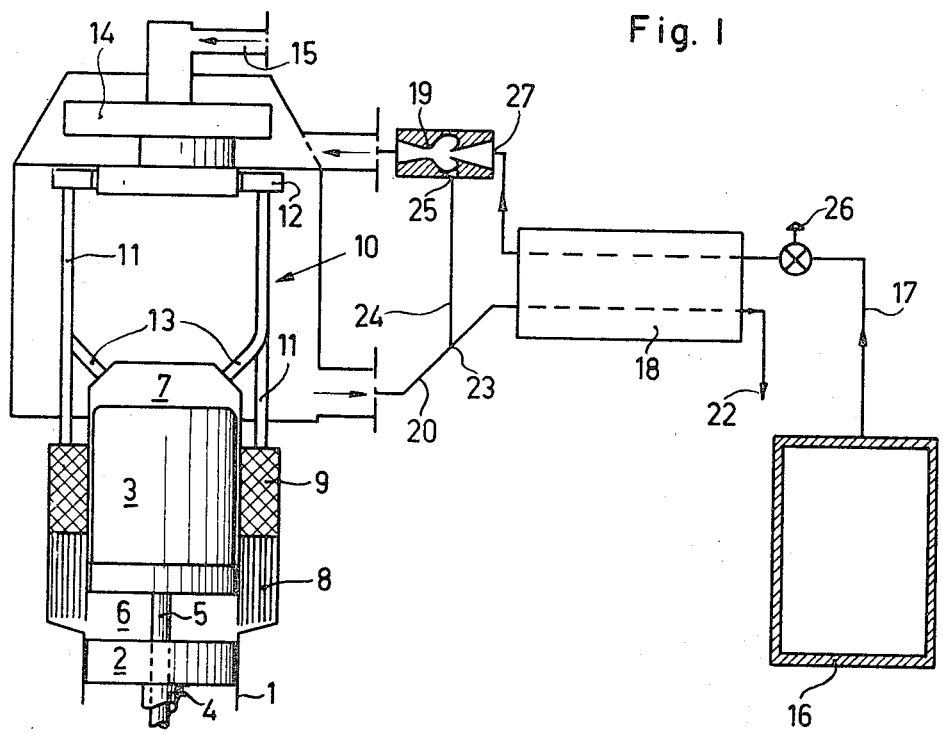
Fig. 1
Fig. 2
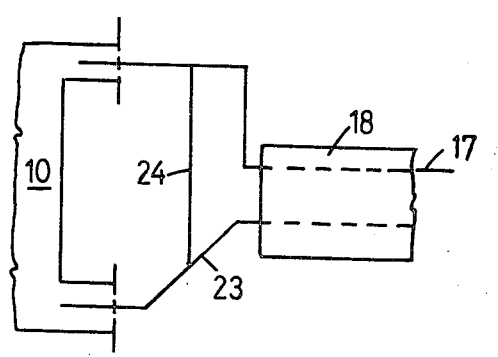
INVENTORS
HERMAN FOKKER
ROELF J. MEIJER
BY
Frank R. Trifari
AGENT

United States Patent Office 3,546,876
Patented Dec. 15, 1970

3,546,876
HOT-GAS ENGINE
Herman Fokker and Roelf Jan Meijer, Emmasingel, Eindhoven, Netherlands, assignors, by mesne assignments, to U.S. Philips Corporation, New York, N.Y., a corporation of Delaware
Filed Oct. 18, 1968, Ser. No. 768,842
Claims priority, application Netherlands, Nov. 2, 1967, 6714885
Int. Cl. F03g 7/06; F25b 9/00
U.S. Cl. 60—24                                3 Claims

ABSTRACT OF THE DISCLOSURE

A hot-gas engine having its burner supplied with oxygen in place of air, mixed with a variable amount of exhausting combustion gas to control the flame temperature.

---

The invention relates to a hot-gas engine including one or more compression spaces of variable volume and comparatively low average temperature which are connected to one or more expansion spaces of likewise variable volume and comparatively high average temperature. A regenerator and a heater are provided between said spaces, and the engine furthermore includes at least one burner device having at least one adjoining inlet for fuel, at least one supply duct for gas containing oxygen adjoining the device through a pre-heater and an adjoining exhaust duct for combustion gases which terminates outside the engine through the pre-heater. In this known hot-gas engine, fuel and combustion air are supplied to the burner device, such that the engine is only usable in places where there is sufficient air.

Under certain circumstances, as when the engine is placed in a craft for deep-sea research, there is insufficient air for proper operation. Accordingly, an object of the invention is to provide a hot-gas engine in which the operation of its burner device is independent of the surroundings in which this engine is set up.

To achieve the envisaged object the hot-gas engine according to the invention is characterized in that the side of the supply duct for oxygen-containing gas remote from the burner device can be connected to a vessel containing oxygen; provided between this supply duct and the exhaust duct for the combination gases is a connection (a) along which part of the combustion gases can flow in the supply duct for the oxygen, and (b) which adjoins at one end the part of the supply duct located between the pre-heater and the burner device and at the other end adjoins the part of the exhaust duct likewise located between the pre-heater and the burner device.

In the hot-gas engine according to the invention, oxygen instead of air is supplied to the burner device. If this pure oxygen would be supplied only to the burner, the flame temperature would become much too high with the result that the walls of the burner device would collapse. To avoid this, an inert gas is added to the supplied oxygen and this at such a ratio that the oxygen content of the mixture of gases supplied to the burner is comparable with the oxygen content in air. As a result the flame temperature becomes approximately the same again as when air is supplied.

According to the invention part of the flue gases is used as an inert gas, which is supplied to the supply duct for the oxygen. This so-called recirculation of part of the flue gases could take place after these flue gases have passed the pre-heater and before the oxygen has entered the pre-heater, thus at a comparatively low temperature. This would mean that the mass streams flowing through the pre-heater and the heat to be transferred would be substantially the same as when using air, so that the pre-heater must be substantially as large as when using air. The burner output is very important certainly when using oxygen instead of air. Reduction of the loss of heat due to the exhaust gases here means not only a lower consumption of fuel but also a lower consumption of oxygen or a greater range of action with a certain supply of fuel and oxygen.

According to the invention the flue gases are recirculated at a high temperature, that is to say, prior to entering the pre-heater part of the flue gas stream is supplied to the stream of oxygen which has passed the pre-heater. This has the advantage that the mass streams flowing through the pre-heater are now a factor of 2½ lower than the mass streams if recirculation takes place at a low temperature, hence before the pre-heater. For this reason it would be expected that the pre-heater could also be a factor of 2½ smaller at the same loss of heat. However, it has surprisingly been found that the pre-heater may be a factor of 10 smaller at the same loss of heat than when recirculation takes place at a lower temperature, hence before the pre-heater. This can be explained by the fact that the unbalance factor, which means the ratio of the heat-capacity flow intensities of the gas streams passing the pre-heater forwards and backwards, increases enormously. When using a certain fuel the unbalance factor was 1.225 at recirculation on the cold side, and 1.85 at recirculation on the hot side.

It is to be noted that in combustion engines with internal combustion, it is known per se to use oxygen instead of combustion air, part of the flue gases being supplied to the stream of oxygen after being cooled at least partially. However, these engines do not have pre-heaters so that also the above-mentioned advantages obtained by recirculating the combustion gases on the hot side do not occur in these engines. According to the invention, the flue gases can be supplied to the oxygen in the supply duct with the air of a fan placed in the connection or with the aid of an injector provided in the supply duct, the suction side of said injector adjoining the exhaust duct for the combustion gases.

In order that the invention may be readily carried into effect, it will now be described in detail by way of example, with references to the accompanying diagrammatic drawing which shows, not to scale, a hot-gas engine in which oxygen instead of air is supplied to the burner.

In the FIG. 1 a cylinder is indicated by the reference numeral 1 in which a piston 2 and a displacer 3 can move with a phase shift. The piston 2 and the displacer 3 are connected through a piston rod 4 and a displacer rod 5, respectively, to a driving mechanism not shown. A compression space 6 is located between the piston 2 and the displacer 3 while an expansion space 7 is provided above the displacer 3. The compression space 6 and the expansion space 7 communicate with each other through a cooler 8, a regenerator 9 and a heater 10. The heater 10 is built up of a plurality of pipes 11 which are connected at one end to the regenerator 9 and at the other end to a ring duct 12, and a plurality of pipes 13 which are connected at one end to the ring duct 12 and at the other end to the expansion space 7. Furthermore, the hot-gas engine is provided with a burner device 14 to which a supply duct 15 for fuel is connected. Furthermore, a vessel 16 containing oxygen under pressure is associated with the engine. A duct 17 is connected to the upper side of the vessel 16, the other side of said duct being connected to the burner device through a pre-heater 18 and an injector 19. Furthermore, a duct 20 is connected to the burner device which duct empties at 22 into the surroundings through the pre-heater 1. A connection duct 24 is connected at 23 to the duct 20, the other side of duct 24 being connected to the suction side 25 of the injector 19 as shown in FIG. 1 or directly to supply duct 17 as shown in FIG. 2.

The operation of the hot-gas engine in itself is supposed to be known, while the operation of the burner device is as follows. Oxygen from vessel 16 flows via duct 17, in which of course a control cock 26 is included, through the pre-heater 18 where this oxygen is heated in heat exchange with the combustion gases and subsequently supplied to the inlet 27 of the injector 19. The oxygen heated in the pre-heater 18 up to the temperature of the combustion gases causes a certain suction pressure in the suction aperture 25 while flowing through the injector so that a quantity of the flue gases is exhausted from duct 20 and mixed with the oxygen. This gas mixture discharged from the injector is supplied to the burner device where it reacts with the fuel. Thus, in this device part of the exhausted flue gases is added, prior to these gases having entered the pre-heater 18, to oxygen which has passed the pre-heater 18. This means that the mass streams flowing through the pre-heater 18 will be considerably smaller than when the combustion gases would be added to the oxygen on the cold side of the pre-heater 18, thus after the flue gases have passed the pre-heater 18 and before the oxygen has entered the pre-heater 18. Even for this reason the pre-heater 18 could be smaller at the same losses of heat. However, as has already been described in the foregoing the unbalance factor, which means the ratio of the heat-capacity flow intensities of the combustion gases and oxygen flowing through the pre-heater 18 is such that for this reason another large reduction of the pre-heater 18 occurs at the same heat losses. Therefore the pre-heater 18 may even be a factor of 10 smaller than when the flue gases would be recirculated on the cold side. This yields a great saving of cost and space.

The advantage of using an injector 19 for mixing the flue gases with oxygen is that the mixing ratio is constant at different mass streams. In FIG. 3 a fan 28 in connection duct 24 instead of an injector may be provided. It is alternatively possible to have liquid oxygen instead of gaseous oxygen available in the vessel 16. It is then possible to evaporate this oxygen with the aid of the combustion gases and to bring it to the required pressure. It is alternatively possible to bring the liquid oxygen to the required pressure with the aid of a liquid pump.

What is claimed is:

1. A hot-gas engine including at least one compression space of variable volume and comparatively low average temperature which is connected to at least one expansion spacer of likewise variable volume and comparatively high average temperature, a regenerator and a heater being provided in the connection between said spaces, the engine furthermore including at least one burner device having at least one adjoining inlet for fuel, at least one supply duct for gas containing oxygen adjoining said device through a pre-heater and an adjoining exhaust duct for combustion gases which terminates outside the engine through the pre-heater, characterized in that the side of the supply duct for oxygen-containing gas remote from the burner device is connected to a vessel containing oxygen, a connection duct being provided between this supply duct and the exhaust duct for the combustion gases, along which connection duct part of the combustion gases can flow into the supply duct for the oxygen, the connection duct having one end joining the part of the supply duct located between the pre-heater and the burner device and the other end joining the part of the exhaust duct located between the pre-heater and the burner device.

2. A hot-gas engine as claimed in claim 1, characterized in that a fan is provided in the connection duct between the supply duct and the exhaust duct.

3. A hot-gas engine as claimed in claim 1, characterized in that an injector is provided in the part of the supply duct between the pre-heater and the burner device, said connection duct between supply duct and exhaust duct adjoining the suction side of said injector.

References Cited
UNITED STATES PATENTS

| | | | |
|---|---|---|---|
| 2,894,368 | 7/1959 | Van Heeckeren | 60—24 |
| 2,963,871 | 12/1960 | Meijer | 60—24X |
| 3,011,306 | 12/1961 | Meijer | 60—24 |
| 3,383,871 | 5/1968 | Rietdijk et al. | 62—6 |

MARTIN P. SCHWADRON, Primary Examiner

R. BUNEVICH, Assistant Examiner

U.S. Cl. X.R.

62—6